United States Patent
Maeyama et al.

(10) Patent No.: US 9,242,507 B2
(45) Date of Patent: Jan. 26, 2016

(54) GUIDE RAIL TYPE VEHICLE

(75) Inventors: Hiroyuki Maeyama, Tokyo (JP);
Hiromichi Yamamoto, Tokyo (JP);
Kousuke Katahira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 142 days.

(21) Appl. No.: 13/812,981

(22) PCT Filed: Jul. 25, 2011

(86) PCT No.: PCT/JP2011/066829
§ 371 (c)(1),
(2), (4) Date: Jan. 29, 2013

(87) PCT Pub. No.: WO2012/086250
PCT Pub. Date: Jun. 28, 2012

(65) Prior Publication Data
US 2013/0125780 A1    May 23, 2013

(30) Foreign Application Priority Data

Dec. 20, 2010  (JP) .................................. 2010-283194

(51) Int. Cl.
*B60B 17/00*      (2006.01)
*B60B 23/04*      (2006.01)
(Continued)

(52) U.S. Cl.
CPC ................. *B60B 17/00* (2013.01); *B60B 23/04* (2013.01); *B60B 23/10* (2013.01); *B60B 25/20* (2013.01)

(58) Field of Classification Search
CPC ............. B62D 1/265; B61F 9/00; B61F 7/00; B60B 17/00; B60B 23/04; B60B 25/20; B60B 23/10

USPC ............ 105/215.1, 215.2, 178; 104/242, 243, 104/245, 247, 130.07
See application file for complete search history.

(56) References Cited

U.S. PATENT DOCUMENTS 617,180 A * 1/1899 Pearce .......................... 105/178

FOREIGN PATENT DOCUMENTS

| CN | 101400559 | 4/2009 |
|----|-----------|--------|
| JP | 62-18444  | 2/1987 |

(Continued)

OTHER PUBLICATIONS

Japanese Notice of Reasons for Rejection mailed Aug. 6, 2013 in corresponding Japanese Application No. 2010-283194, with English translation.

(Continued)

*Primary Examiner* — Mark Le
(74) *Attorney, Agent, or Firm* — Wenderoth, Lind & Ponack, L.L.P.

(57) ABSTRACT

A guide rail type vehicle is provided with a guide wheel that comes into rolling contact with a guide rail, a switching wheel that is comes into rolling contact with a switching rail installed at a switching location of the guide rail, a wheel axle in which the guide wheel is connected to the top end and the switching wheel is connected to the bottom end, a support receiver of which the height dimension is set to be smaller than the corresponding length dimension of the wheel axle and which supports the wheel axle, and adjustment device which adjusts the sizes of a gap of the guide wheel side and a gap of the switching wheel side, which are accessed from a direction orthogonal to the axial direction of the wheel axle, and are therefore capable of adjusting the height of the guide wheel and the switching wheel.

4 Claims, 7 Drawing Sheets

(51) Int. Cl.
  *B60B 23/10*  (2006.01)
  *B60B 25/20*  (2006.01)

(56) References Cited

FOREIGN PATENT DOCUMENTS

| JP | 7-40361 | 7/1995 |
| JP | 11-255115 | 9/1999 |
| JP | 11-278004 | 10/1999 |
| JP | 3181896 | 7/2001 |
| JP | 2003-146204 | 5/2003 |
| JP | 2006-347425 | 12/2006 |
| JP | 2010-158942 | 7/2010 |
| JP | 2010-188958 | 9/2010 |
| JP | 2010-195310 | 9/2010 |
| WO | 2010/109683 | 9/2010 |

OTHER PUBLICATIONS

International Search Report issued Oct. 25, 2011 in International (PCT) Application No. PCT/JP2011/066829.
Written Opinion of the International Searching Authority issued Oct. 25, 2011 in International (PCT) Application No. PCT/JP2011/066829.
Chinese Office Action issued Aug. 26, 2014 in corresponding Chinese Patent Application No. 201180037278.0 with partial English translation.

* cited by examiner

GUIDE RAIL TYPE VEHICLE

TECHNICAL FIELD

The present invention relates to a guide rail type vehicle running along a guide rail.

Priority is claimed on Japanese Patent Application No. 2010-283194, filed Dec. 20, 2010, the content of which is incorporated herein by reference.

BACKGROUND ART

In recent years, as new transportation system other than buses or trains, some of innovative transportation systems have garnered attention. One of new transportation systems is known in which a vehicle having running wheels formed from rubber tires runs on a track (Automated People Mover Automated Transit Systems).

This type of vehicle (the guide rail type vehicle) is provided with a guide wheel which comes into rolling contact along a guide rail. Thus, the height adjustment of the guide wheel is performed so that the guide wheel is attached to a body of the vehicle so as to maintain the height of the guide wheel with respect to the guide rail appropriately.

For example, a guide wheel support apparatus disclosed in PTL 1 is configured such that a bushing, of which an inner periphery surface is formed in a taper shape constricted upwards and which is freely enlarged in the diameter using a slit, is fitted into an axle hole formed in a guide bar supporting the guide wheel, the bushing is protruded upward from the guide wheel, and the bushing is formed in the taper shape constructed upwards. Along with this, a wheel axle of the guide wheel including a screw portion on the top portion thereof is inserted into the bushing from below, and a nut is fastened to the screw portion which is protruded upward from the guide bar.

Thus, in the guide wheel support apparatus, since the bushing is freely enlarged in the diameter and then the height of the wheel axle can be adjusted with respect to the bushing, the guide wheel can be disposed at a desired height with respect to the guide bar.

In addition, the height of the guide bar is adjusted and the height of the guide wheel is adjusted by providing a liner between the guide bar supporting the guide wheel and a link connected to the guide bar or by attaching the guide bar to the link using a screw which is able to adjust the attachment height, without providing the guide wheel support apparatus described above.

CITATION LIST

Patent Literature

[PTL 1] Japanese Unexamined Utility Model Application, First Publication No. H07-40361.

SUMMARY OF INVENTION

Technical Problem

However, in a case where the guide wheel is connected to one end of the wheel axle and a switching wheel is connected to the other end, it is difficult to apply the guide wheel support apparatus of PTL 1 to the height adjustment of the guide wheel and the switching wheel.

In addition, in the guide wheel support apparatus, an operator must press and keep the bushing and the wheel axle using hands or the like and then the work is complicated. Since a plurality of guide wheels is provided in the guide rail type vehicle, it is difficult to make the height of the guide wheels uniform.

In addition, when the guide wheel support apparatus is used for over an extended period, a step occurs due to rust, interference or the like at an axle portion of the guide wheel in the slit formed in the bushing. It is necessary to disassemble and repair the guide wheel support apparatus.

In addition, in the height adjustment method of the guide wheel by adjusting the height of the guide bar, in a case where the guide wheels supported to both ends of the guide bar are adjusted to different heights each other, the guide bar may not be horizontal. Thus, the link moves the guide bar horizontally and a connection portion between the link and the guide bar rotates around a right angle axle with respect to the guide bar. Thus, if the guide bar is not horizontal, there is concern that the link may not function effectively due to an excessive force on the right angle axle and the durability thereof may be lowered.

In addition, since a bolt or a receiver for connection is provided obliquely at the connection portion between the guide bar and the link, there is concern that the bolt may be loosened by applying a bending load to the bolt or to the receiver.

The invention is made to solve the problems described above and provides a guide rail type vehicle in which the heights of a guide wheel and a switching wheel can be easily and reliably adjusted without changing the height of a guide bar.

Solution to Problem

According to the invention, there is provided a guide rail type vehicle running along a guide rail, including: a guide wheel which comes rolling contact with the guide rail; a switching wheel which comes into rolling contact with a switching rail installed at a switching location of the guide rail; a wheel axle of which the guide wheel is connected to one end and the switching wheel is connected to the other end; a support receiver of which the dimension in height direction is set to be smaller than the corresponding length dimension of the wheel axle and which supports the wheel axle; and adjustment device which is capable of adjusting the size of gaps between the support receiver and the guide wheel, and between the support receiver and the switching wheel.

Since the invention includes the adjustment device which is capable of adjusting the size of gaps between the support receiver and the guide wheel, and between the support receiver and the switching wheel, the height of the guide wheel and the switching wheel can be easily and reliably adjusted.

In addition, even though the height of the guide wheel and the switching wheel is adjusted, since the height of the support receiver is not changed, the height of the guide bar on which the support receiver is provided is not changed. Thus, it is not necessary to adjust the height of the link connected to the guide bar, the connection portion between the guide bar and the link, or the like. Thus, since the guide bar is not oblique with respect to the horizontal direction even though the heights of plural guide wheels and the switching wheels are adjusted to different heights, the durability can be increased without applying an unnecessary force to the link, to the connection portion of the link between the link and the guide bar, or the like.

In addition, in the guide rail type vehicle according to the invention, the adjustment device may have a plurality of height adjustment shims which is able to be mounted in the gap between the support receiver and the guide wheel, and the gap between the support receiver and the switching wheel, and a position of the guide wheel and the switching wheel in height direction may be adjusted by mounting the height adjustment shims on one or both of the gap between the support receiver and the guide wheel, and the gap between the support receiver and the switching wheel.

According to the configuration described above, the heights of the guide wheel and the switching wheel can be easily adjusted by moving the height adjustment shims.

In addition, the number of the height adjustment shims mounted in the gap between the support receiver and the guide wheel and the number of the height adjustment shims mounted in the gap between the support receiver and the switching wheel are adjusted by providing a plurality of height adjustment shims so that the height of the guide wheel and the switching wheel can be reliably adjusted.

In addition, in the guide rail type vehicle according to the invention, it is preferable that the wheel axle be detachably mounted on the support receiver and the height adjustment shim be formed in an annular shape and the wheel axle be inserted thereinto.

According to the configuration described above, since the height adjustment shims move along the wheel axle and do not drop off from the wheel axle in a state where the wheel axle is inserted thereto, it is not necessary to store the height adjustment shims separately and the management of the adjustment device can be simplified.

In addition, in the guide rail type vehicle according to the invention, the support receiver may include a support receiving body, which a concave portion that the wheel axle is able to be inserted from the side of the support receiving body is formed, and the dimension of which in the height direction is set to be shorter than the length dimension of the wheel axle by a height adjustment allowance; and a lid portion, which is joined to the support receiving body with a bolt and covers the concave portion by forming a surface contract with the support receiving body, wherein the adjustment device has teeth provided between contacting surfaces of the support receiving body and the lid portion with a predetermined gap in the height direction, the teeth provided on the support receiving body and the lid portion being engaged each other, and a long hole is formed to the lid portion, the long hole being extended in the height direction in such a way that the bolt is able to be inserted to the long hole through the extended height direction.

According to the configuration described above, since the lid portion and the support receiving body may be connected by moving the guide wheel and the switching wheel at a desired height and engaging the teeth of one another, the height of the guide wheel and the switching wheel can be easily adjusted.

In addition, the long hole into which the bolt extending in the height direction is able to be inserted is formed at the lid portion so that the lid portion and the support receiving body can be connected using the bolts in the range of the dimension of the long hole in the height direction even though the lid portion and the support receiving body are disposed at the different heights.

In addition, since a dedicated part or a jig is not required for adjusting the height of the guide wheel and the switching wheel, the management of the adjustment device can be simplified.

In addition, in the guide rail type vehicle according to the invention, it is preferable that the adjustment device may include a screw portion formed on an outer peripheral surface of the wheel axle and a nut which is screwed in the screw portion and is disposed so as to abut on the upper surface of the support receiver, in which the support receiver may be configured in such a manner that the dimension in the height direction is set to be shorter than the length dimension of the wheel axle by the height adjustment allowance and height allowance of the nut.

As described above, since the axial portion is disposed so that the nut abuts the upper surface of the support receiver and the height of the nut with respect to the axial portion (the screw portion) can be adjusted. Accordingly, the height of the axial portion and the support receiver can be adjusted and the height of the guide wheel and the switching wheel can be easily adjusted.

In addition, since the height of the nut is set with respect to the screw portion in non-step, the height of the guide wheel and the switching wheel can be adjusted accurately.

In addition, since a dedicated part or a jig is not required for adjusting the height of the guide wheel and the switching wheel, the management of the adjustment device can be simplified.

Advantageous Effects of Invention

According to invention, since the height of the guide wheel and the switching wheel can be easily and reliably adjusted, and there is no influence on the link that is connected to the guide bar where the support receiver is provided or to the connection portion between the guide bar and the link, the guide rail type vehicle can be run in a satisfactory state.

DESCRIPTION OF EMBODIMENTS

First Embodiment

Hereinafter, a guide rail type vehicle according to the embodiment of the invention is described, based on FIGS. 1A to 2.

Figure 1A:
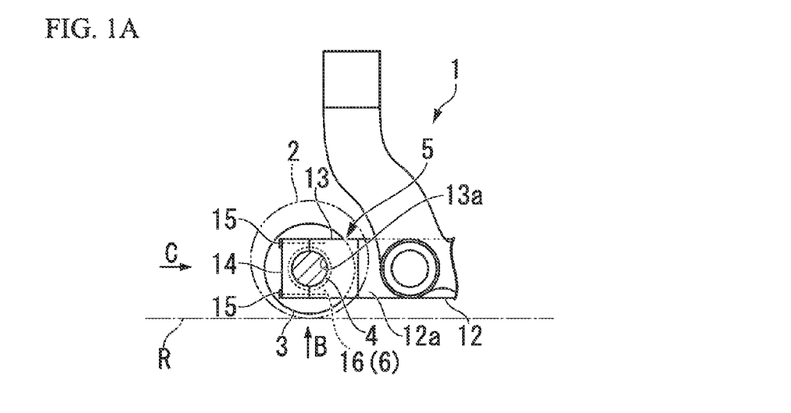
FIG. 1A is a view illustrating an example of a height adjustment device of a guide rail type vehicle according to a first embodiment of the invention and is a cross-sectional view of the height adjustment device seen from a plan view, that is, taken along line A-A in FIG. 1B.
Figure 1B:
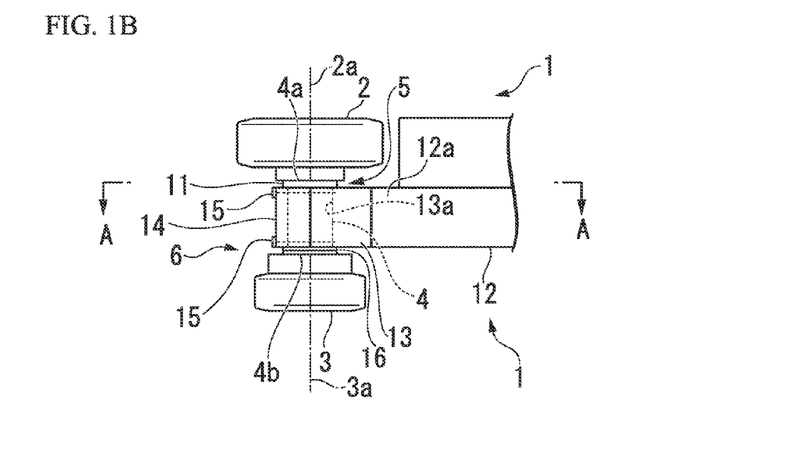
FIG. 1B is a side view of the height adjustment device seen from the direction of arrow B in FIG. 1A.
Figure 1C:
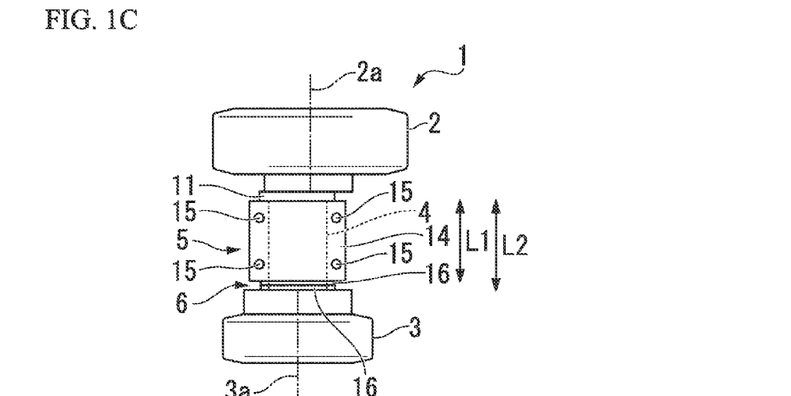
FIG. 1C is another side view of the height adjustment device seen from the direction of arrow C in FIG. 1A.

As shown in FIGS. 1A to 1C, a guide rail type vehicle 1 according to the embodiment is a vehicle running along a guide rail R and includes a guide wheel 2 which comes into rolling contact with the guide rail, a switching wheel 3 which comes into rolling contact with a switching rail (not shown) installed at a switching location on the guide rail R, a wheel axle 4 in which the guide wheel 2 is connected to a top end 4a and the switching wheel 3 is connected to a bottom end 4b, a support receiver 5 which supports the wheel axle 4, and an adjustment device 6 which is capable of adjusting the height of the guide wheel 2 and the switching wheel 3.

The guide wheel 2 and the switching wheel 3 are eccentric to each other and are connected to the wheel axle 4.

As shown in FIGS. 1B and 1C, the wheel axle 4 supports the guide wheel 2 via a bearing in a rotatable manner around a guide wheel axle 2a and supports the switching wheel 3 via the bearing in the rotatable manner around a switching wheel axle 3a.

In addition, as shown in FIGS. 1A and 1B, the wheel axle 4 includes a flange 11 protruding to the outside in the radial direction at the top end 4a and the flange 11 abuts the guide wheel 2 via the bearing.

The wheel axle 4 is provided in the vertical direction and in the embodiment, is formed in one straight line shape. In addition, the wheel axle 4 may be formed in a crank shape.

As shown in FIGS. 1A and 1B, the support receivers 5 are provided at both end portions 12a of a guide bar 12 which is supported by a guide rail type vehicle body (not shown) respectively thereby the support receivers 5 support the wheel axle 4 at both end portions 12a of the guide bar 12. In addition, the guide rail type vehicle 1 is provided with a plurality of guide bars 12, a plurality of guide wheels 2 and switching wheels 3.

In addition, the support receiver 5 includes a support receiving body 13 which is fixed to the guide bar 12 and where a concave portion 13a is formed into which the wheel axle 4 can be inserted from the side thereof, and a lid portion 14 which is detachably mounted on the support receiving body 13. The lid portion 14 is mounted on the support receiving body 13 so that the concave portion 13a of the support receiving body 13 can be closed.

Thus, the wheel axle 4 is inserted into the concave portion 13a of the support receiving body 13 and the lid portion 14 is mounted on the support receiving body 13 and then the support receiving body 13 and the lid portion 14 are fixed using bolts 15. Accordingly, since the wheel axle 4 is sandwiched between the support receiving body 13 and the lid portion 14 in a state where the wheel axle 4 abuts the support receiving body 13 and the lid portion 14, the wheel axle 4 is fixed to the support receiver 5.

At this time, the support receiving body 13, the lid portion 14 and the wheel axle 4 are configured so as not to be relatively displaced from each other.

In addition, as shown in FIG. 1C, the support receiver 5 (the support receiving body 13 and the lid portion 14) is configured in such a manner that the dimension L1 thereof in the height direction is set to be shorter than the length dimension L2 of the wheel axle 4. Here, the dimension L2 of the wheel axle 4 in the height direction is corresponding to the length from the upper surface of the switching wheel 3 to the lower surface of the flange 11.

In addition, the support receiving body 13 and the lid portion 14 are formed with the same dimension in the height direction as each other, and are fixed using the bolts 15 in a state where each top end and each bottom end are aligned with each other.

Thus, when the wheel axle 4 is supported on the support receiver 5 (the support receiving body 13 and the lid portion 14), a gap is formed on one or both of a gap between the support receiver 5 and the guide wheel 2, and a gap between the support receiver 5 and the switching wheel 3.

Here, as shown in FIGS. 1A to 1C, the gap between the support receiver 5 and the guide wheel 2 is referred to as a guide wheel side gap d1 and the gap between the support receiver 5 and the switching wheel 3 is referred to as a switching wheel side gap d2, and a description thereof is given below.

The adjustment device 6 includes plural height adjustment shims 16 which can be mounted on the guide wheel side gap d1 and the switching wheel side gap d2. In addition, in FIGS. 1A to 2, two height adjustment shims 16 are provided, however, the number of the height adjustment shims 16 may be set arbitrarily.

The height adjustment shim 16 is formed in a circular shape and then the wheel axle 4 is inserted. Thus, the height adjustment shim 16 is configured to be movable in the height direction along the wheel axle 4.

In addition, the height adjustment shim 16 is configured in such a manner that a hole portion, into which the wheel axle 4 inserted, is formed smaller than the outer diameter of the flange 11 of the wheel axle 4 and the outer diameter of the switching wheel 3, and the height adjustment shim 16 is not removed from the wheel axle 4.

The height adjustment shims 16 are configured in such a manner that an operator accesses to the height adjustment shims 16 from the wheel axle 4 and then can move the height adjustment shim 16 in the height direction.

Thus, the height adjustment shims 16 are disposed on one or both of the guide wheel side gap d1 and the switching wheel side gap d2 and then the sizes of the guide wheel side gap d1 and the switching wheel side gap d2 are adjusted. Accordingly, the height of the guide wheel 2 and the switching wheel 3 are adjusted.

Thus, the difference between the dimension L1 of the support receiver 5 in the height direction and the length dimension L2 of the wheel axle 4 corresponds to a value which matches the dimension of all the height adjustment shims 16 in the height direction.

For example, the height adjustment shim 16 is formed in the dimension in the height direction of 1 mm to 2 mm.

Next, the height adjustment method of the guide wheel 2 and the switching wheel 3 in the first embodiment is described.

Here, the method of moving upward the guide wheel 2 and the switching wheel 3 using the adjustment device 6 is described. In addition, as shown in a section (a) of FIG. 2, all the height adjustment shims 16 are disposed on the switching wheel side gap d2 before adjusting the height of the guide wheel 2 and the switching wheel 3.

First, the lid portion 14 is removed from the support receiving body 13 by removing the bolts 15 and the guide wheel 2 and the switching wheel 3 with the wheel axle 4 are detached from the support receiving body 13.

Substantially, a portion or all of the height adjustment shims 16 are moved upward along the wheel axle 4. At this time, the number of the moving height adjustment shims 16 is determined so that the value of the total of the dimensions in the height direction for the moving height adjustment shims 16 matches or approximates the dimensions by which the guide wheel 2 and the switching wheel 3 are moved upward.

Subsequently, the wheel axle 4 with the guide wheel 2 and the switching wheel 3 is inserted into the concave portion 13a of the support receiving body 13 in a state the height adjustment shims 16, which is moved upward, is pressed upward. At this time, as shown in a section (b) of FIG. 2, a height adjustment shim 16A, which is moved upward, is disposed on the guide wheel side gap d1 and the other height adjustment shim 16B is disposed on the switching wheel side gap d2.

Figure 2:
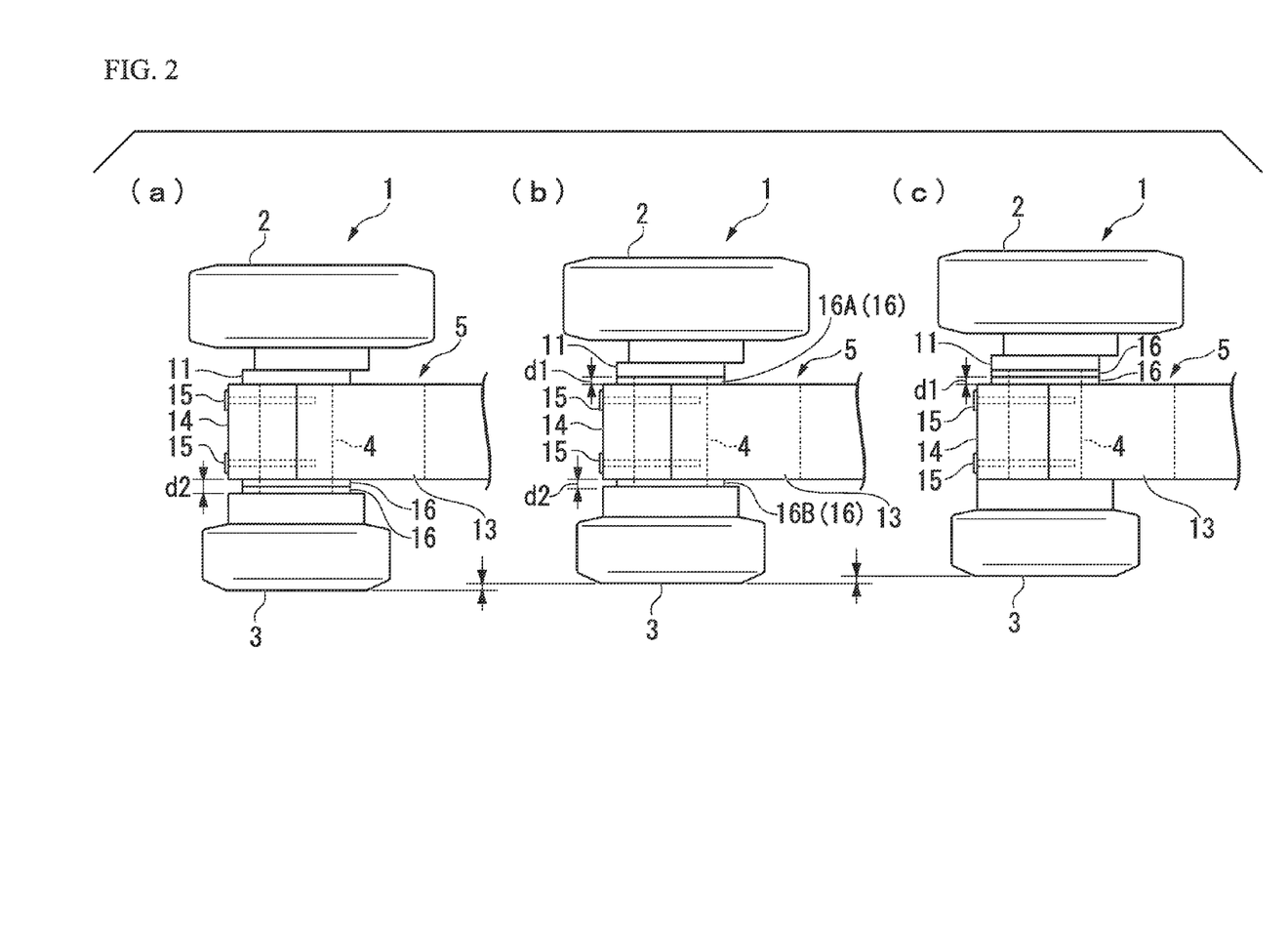
FIG. 2 is an explanatory view illustrating a height adjustment method using adjustment device shown in FIGS. 1A to 1C.

In addition, as shown in a section (c) of FIG. 2, when all of the height adjustment shims 16 are moved upward, the switching wheel side gap d2 may not be present.

Subsequently, the lid portion 14 is mounted on the support receiving body 13 and they are fixed together using the bolts 15.

Accordingly, the wheel axle 4 is fixed to the support receiver 5 in a state where the guide wheel 2 and the switching wheel 3 are moved upward.

In addition, when the guide wheel 2 and the switching wheel 3 are moved downward, the height adjustment shim 16 disposed on the guide wheel side gap d1 may be moved to the switching wheel side gap d2.

Next, an advantage of the guide rail type vehicle 1 described above is described using the drawings.

According to the guide rail type vehicle 1 according to the first embodiment, the wheel axle 4 with the guide wheel 2 and the switching wheel 3 is removed from the support receiver 5, and the height adjustment shim 16, into which the wheel axle 4 is inserted, is moved in the height direction. Accordingly, the heights of the guide wheel 2 and the switching wheel 3 can be adjusted by adjusting the dimensions of the guide wheel side gap d1 and the switching wheel side gap d2 in the height direction. Thus, the height adjustment of the guide wheel 2 and the switching wheel 3 can be easily and reliably performed.

In addition, the height of the support receiver 5 is not changed even though the heights of the guide wheel 2 and the switching wheel 3 are adjusted. Thus, the height of the guide bar 12, where the support receiver 5 is provided, is not changed and it is not necessary to adjust the height of a link (not shown) connected to the guide bar 12 or a connection portion between the guide bar 12 and the link or the like. Accordingly, the heights adjustment of the guide wheel 2 and the switching wheel 3 can be easily performed.

Further, since the guide bar 12 is not oblique with respect to the horizontal direction even though plural guide wheels 2 and the switching wheels 3 are adjusted to different heights, a connection member such as a bolt, which connects the guide bar 12 and the link, is not obliquely disposed. Accordingly, since unnecessary force is not applied to the link or the like, a decrease in the durability of the link or the like can be prevented.

In addition, the height adjustment shims 16 are formed in an annular shape and are always inserted into the wheel axle 4. Thus, it is not necessary to store the height adjustment shims 16 separately from the guide rail type vehicle 1 and management thereof can be easily performed.

Next, other embodiments are described, based on the accompanying drawings and members and portions that are the same or similar to the first embodiment described above use the same symbols, and a description thereof is omitted here. Configurations different from the first embodiment are described.

Second Embodiment

As shown in FIGS. 3A to 3D, a guide rail type vehicle 21 according to a second embodiment includes an adjustment device 24 having plural teeth 22 and 23 which are formed at abutment surfaces 13b and 14b of the support receiving body 13 and the lid portion 14 respectively and then engage with each other, instead of the adjustment device 6 (see, FIGS. 1A to 1C) including the height adjustment shim 16 of the first embodiment. In addition, the lid portion 14 is provided with bolt holes 25 through which the bolts 15 fastening the support receiving body 13 and the lid portion 14 are inserted. The bolt hole 25 is a long hole extending in the height direction.

Here, the teeth formed on the support receiving body 13 are referred to as support receiving body side teeth 22 and the teeth formed on the lid portion 14 are referred to as lid portion side teeth 23, and a description thereof is given below.

Figure 3A:
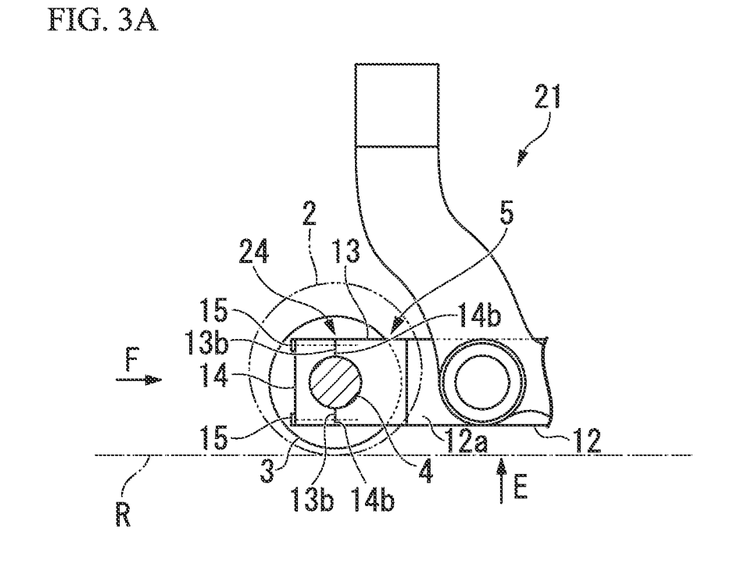
FIG. 3A is a view illustrating an example of height adjustment device of a guide rail type vehicle according to a second embodiment of the invention and is a cross-sectional view of the height adjustment device seen from a plan view, that is, taken along line D-D in FIG. 3B.
Figure 3B:
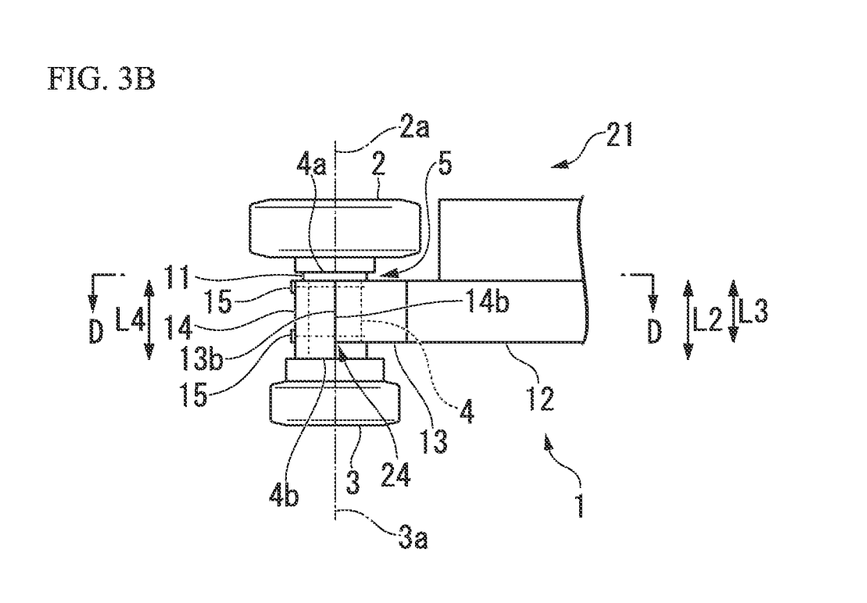
FIG. 3B is a side view of the height adjustment device seen from the direction of arrow E in FIG. 3A.

As shown in FIG. 3B, in the embodiment, the support receiving body 13 and the lid portion 14 are formed in the different dimensions in the height direction. The dimension L3 of the support receiving body 13 in the height direction is set to be shorter than the length dimension L2 of the wheel axle 4 and the dimension L4 of the lid portion 14 in the height direction is set to be the same as the length L2 of the wheel axle 4. In addition, the dimension L4 of the lid portion 14 in the height direction may be set to be shorter than the length L2 of the wheel axle 4.

Figure 3C:
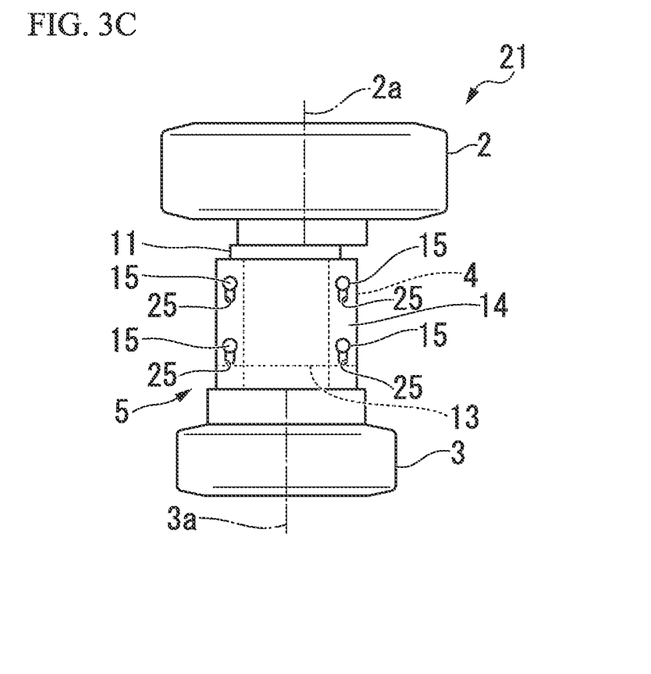
FIG. 3C is another side view of the height adjustment device seen from the direction of arrow F in FIG. 3A.
Figure 3D:
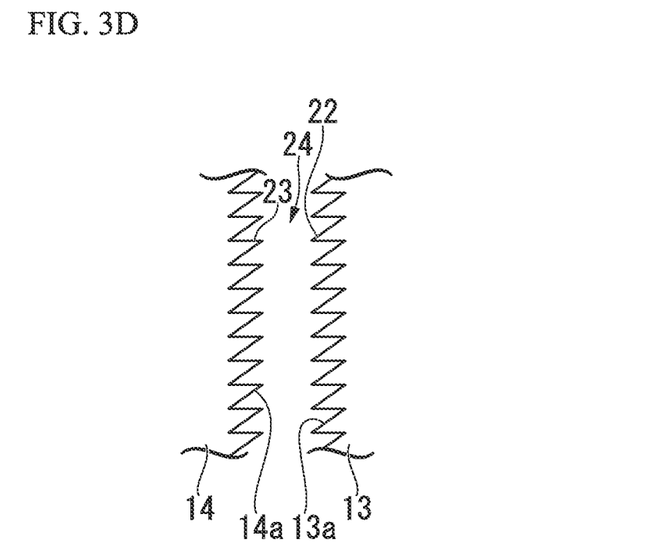
FIG. 3D is a view showing support receiving body side teeth and lid portion side teeth of the height adjustment device.

As shown in FIG. 3D, the support receiving body side teeth 22 and the lid portion side teeth 23 are formed extending substantially in the horizontal direction and are formed in a substantially triangular shape in which the front end side is a corner portion in a side view.

Plural support receiving body side teeth 22 and plural lid portion side teeth 23 are formed in the same shape as each other, and are disposed with a predetermined pitch in the height direction.

In the embodiment, the pitches of the support receiving body side teeth 22 and the lid portion side teeth 23 are 1 mm to 2 mm.

Accordingly, even though the support receiving body 13 and the lid portion 14 are arranged at different heights to each other, the support receiving body side teeth 22 and the lid portion side teeth 23 are configured so as to engage with each other in the arranged height.

Thus, as shown in FIG. 3C, the bolt hole 25 of the lid portion 14 is a long hole extending in the height direction. Accordingly, even though the support receiving body 13 and the lid portion 14 are arranged at different heights to each other, the support receiving body 13 and the lid portion 14 can be fixed using the same bolt holes 25.

In addition, the support receiving body 13 and the lid portion 14 are configured so as to be joined at different heights to each other in a range of dimension of the bolt hole 25 of the lid portion 14 in the height direction.

Next, the method of adjusting the height of the guide wheel 2 and the switching wheel 3 in the second embodiment is described.

Here, the method of moving upward the guide wheel 2 and the switching wheel 3 using the adjustment device 24 is described. In addition, as shown in a section (a) of FIG. 4, the lid portion 14 are disposed on the lowest position which can be joined to the support receiving body 13 before the height adjustment of the guide wheel 2 and the switching wheel 3 is performed.

First, the bolts 15 are loosened and the lid portion 14 is separated from the support receiving body 13 to a position where the support receiving body side teeth 22 and the lid portion side teeth 23 do not interfere with each other even though the lid portion 14 is moved upward. At this time, the bolts 15 are inserted into the bolt holes (no reference sign) of the support receiving body 13 and into the bolt holes 25 of the lid portion 14 without removing the bolts 15 from the support receiving body 13 and the lid portion 14.

Sequentially, the lid portion 14 with the wheel axle 4, the guide wheel 2 and the switching wheel 3 is moved upward.

Sequentially, the lid portion 14 is moved to the support receiving body 13 side at the lifted height and the lid portion 14 abuts the support receiving body 13 so that the support receiving body side teeth 22 engage with the lid portion side teeth 23.

Figure 4:
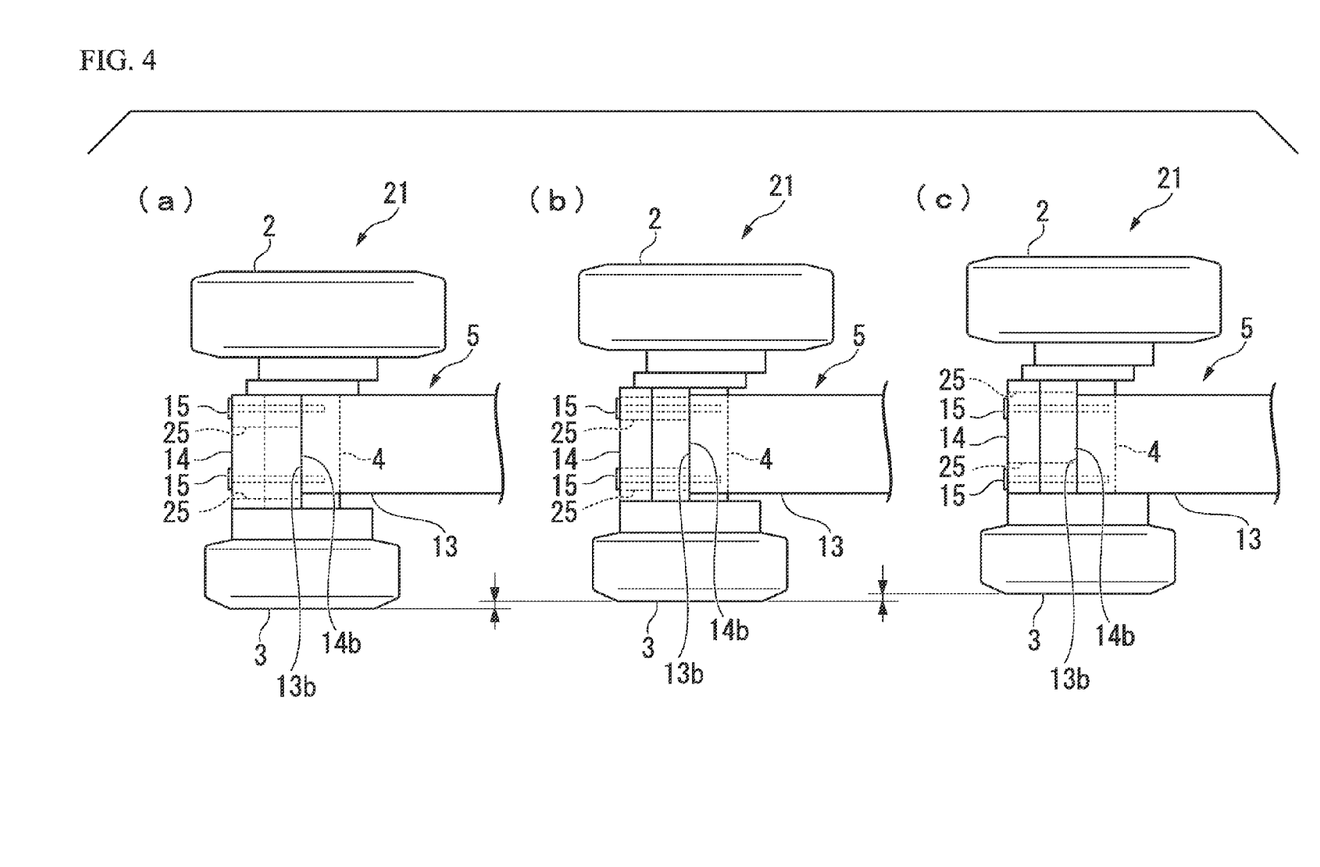
FIG. 4 is an explanatory view illustrating a height adjustment method using the adjustment device shown in FIGS. 3A to 3D.

Thus, as shown in a section (b) or a section (c) in FIG. 4, the lid portion 14 is fixed to the support receiving body 13 using the bolts 15.

Here, the section (b) in FIG. 4 illustrates a shape in which the lid portion 14 is fixed to the support receiving body 13 at an intermediate height in a joinable height range and the section (c) in FIG. 4 illustrates a shape in which the lid portion 14 is fixed to the support receiving body 13 at the uppermost position in a joinable height range.

At this time, the bolt hole 25 of the lid portion 14 is formed in the long hole and then the lid portion 14 can be fixed to the support receiving body 13 using the bolts 15 even though the lid portion 14 is disposed with respect to the support receiving body 13 at different heights from each other.

According to the guide rail type vehicle 21 according to the second embodiment, the bolts 15 which fix the lid portion 14 to the support receiving body 13 are loosened and the lid portion 14 with the wheel axle 4, the guide wheel 2 and the switching wheel 3 is moved to a desired height and then the support receiving body 13 and the lid portion 14 may be fixed using the bolts 15. Therefore, the same effect as the first member is provided.

In addition, since there is no need to completely remove the lid portion 14 from the support receiving body 13 by loosening the bolts 15, the height of the guide wheel 2 and the switching wheel 3 can be easily adjusted.

In addition, since the support receiving body side teeth 22 and the lid portion side teeth 23 are engaged with each other and then the support receiving body 13 and the lid portion 14 are not shifted in the height direction, the support receiver 5 can support the guide wheel 2 and the switching wheel 3 at a desired height.

In addition, since a special part or a jig is not required for adjusting the height of the guide wheel 2 and the switching wheel 3, the management of the adjustment device 24 can be simplified.

Third Embodiment

Figure 5A:
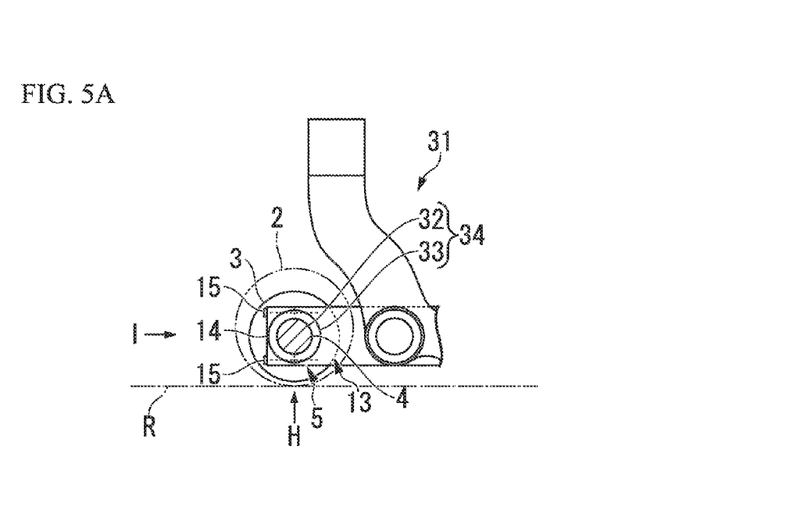
FIG. 5A is a view showing an example of height adjustment device of a guide rail type vehicle according to a third embodiment of the invention and is a cross-sectional view of the height adjustment device seen from a plan view, that is, taken along line G-G in FIG. 5B.
Figure 5B:
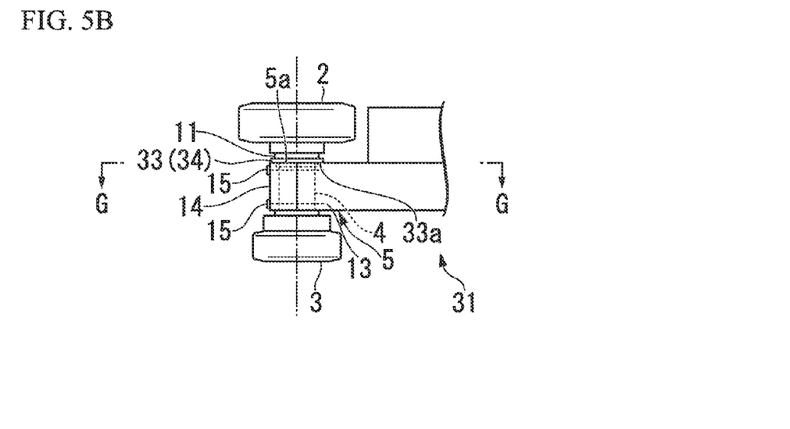
FIG. 5B is a side view of the height adjustment device seen from the direction of arrow H in FIG. 5A.
Figure 5C:
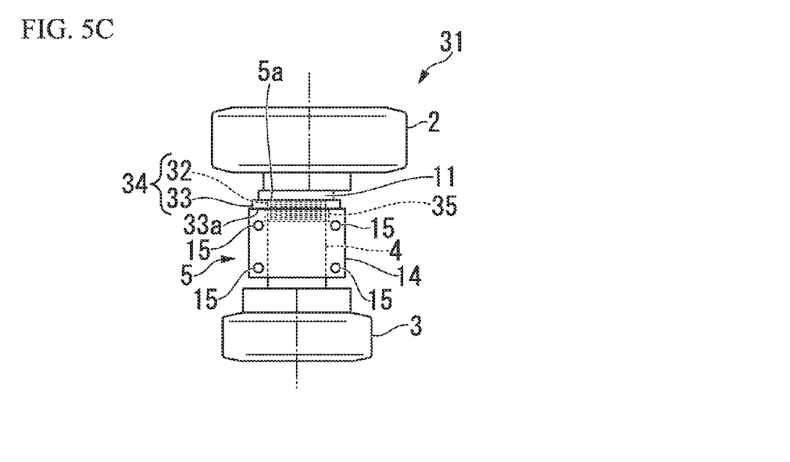
FIG. 5C is another side view of the height adjustment device seen from the direction of arrow I in FIG. 5A.

As shown in FIGS. 5A to 5C, a guide rail type vehicle 31 according to a third embodiment includes an adjustment device 34 having a screw portion 32 on the outer peripheral surface of the upper side of the wheel axle 4 and a nut 33 which is screwed into the screw portion 32 and arranged between the support receiver 5 and the guide wheel 2, instead of the adjustment device 6 (see, FIGS. 1A to 1C) including the height adjustment shim 16 of the first embodiment.

The nut 33 may be disposed at a desired height with respect to the screw portion 32. Thus, the wheel axle 4, to which the nut 33 is attached, is supported to the support receiver 5 so that a lower surface 33a of the nut 33 abuts an upper surface 5a of the support receiver 5.

In the embodiment, as shown in FIG. 5C, a gap 35 is formed between the support receiving body 13 and the lid portion 14 so that the support receiving body 13 and the lid portion 14 do not abut on the screw portion 32. In addition, the lower side from the screw portion 32 of the wheel axle 4 abuts the support receiving body 13 and the lid portion 14, and the lower side from the screw portion 32 of the wheel axle 4 is fixed by being sandwiched between the support receiving body 13 and the lid portion 14.

Next, the height adjustment method of the guide wheel 2 and the switching wheel 3 in the third embodiment is described.

Here, the method of moving upward the guide wheel 2 and the switching wheel 3 using the adjustment device 34 is described. In addition, as shown in a section (a) in FIG. 6, the nut 33 is attached to the uppermost position in which the nut 33 can be screwed into the screw portion 32, before the height adjustment of the guide wheel 2 and the switching wheel 3 is performed.

First, the fixed wheel axle 4 with the lid portion 14 and the support receiving body 13 is loosened by loosening the bolts 15. Accordingly, the wheel axle 4 can be moved in the height direction. At this time, the bolts 15 are inserted into the bolt holes (no reference sign) of the support receiving body 13 and the bolt holes (no reference sign) of the lid portion 14 without removing the bolts 15 from the support receiving body 13 and the lid portion 14.

Subsequently, the nut 33 is turned and then the wheel axle 4 is moved downward. Accordingly, the gap between the nut 33 and the guide wheel 2 is wider than that before the nut 33 is moved.

Figure 6:
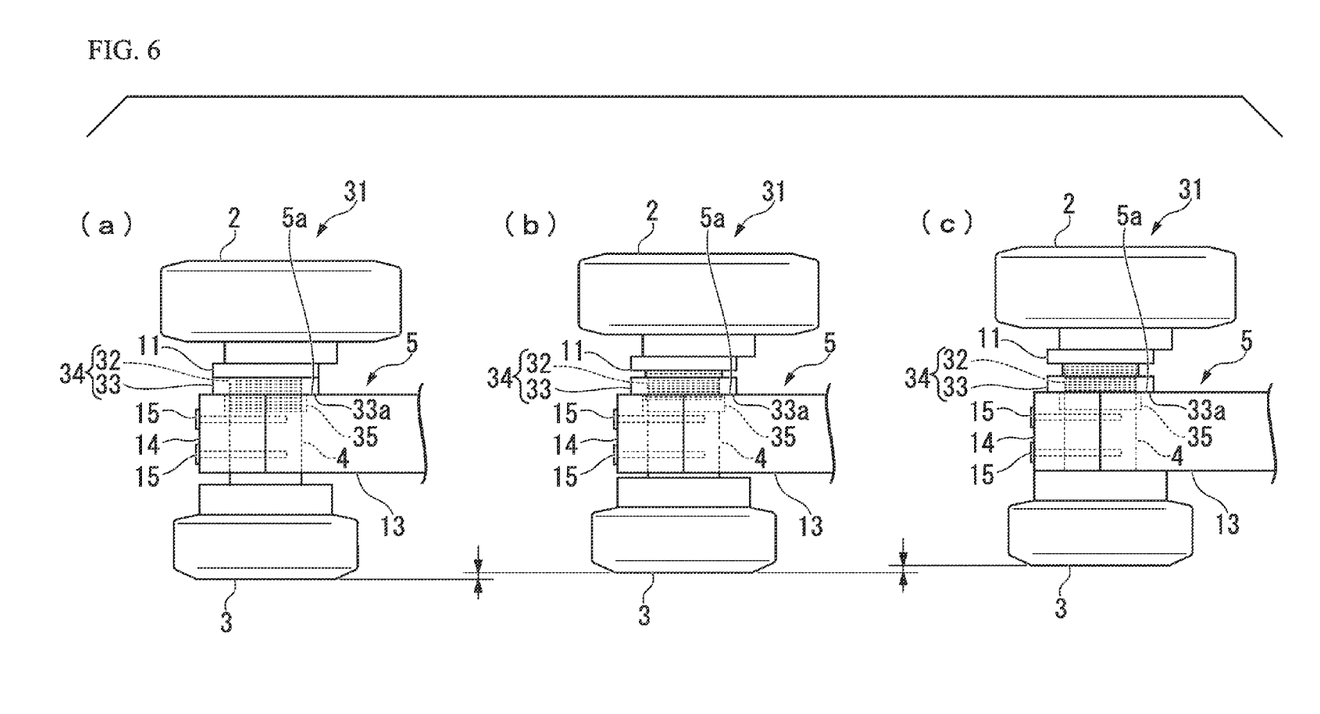
FIG. 6 is an explanatory view illustrating height adjustment method using the adjustment device shown in FIGS. 5A to 5C.

Sequentially, as shown in the section (a) or a section (b) in FIG. 6, the lower surface 33a of the nut 33 abuts the upper surface 5a of the support receiving body 13 and the lid portion 14 is attached to the support receiving body 13 and then the support receiving body 13 and the lid portion 14 are fixed using the bolts 15. At this time, the wheel axle 4 is fixed to the support receiving body 13 and the lid portion 14.

Thus, the guide wheel 2 and the switching wheel 3 are adjusted and disposed further upward by widening the gap between the nut 33 and the guide wheel 2 than before adjustment.

According to the guide rail type vehicle 31 in the third embodiment, the lid portion 14 and the support receiving body 13 may be fixed to a desired position by loosening the bolts 15, which fix the lid portion 14 to the support receiving body 13, and by rotating the nut 33 and moving the nut 33 in the height direction. Thus, the same advantage as the first embodiment is provided.

In addition, since the height is adjusted by rotating the nut 33, the height adjustment of the guide wheel 2 and the switching wheel 3 can be performed in non-step.

In addition, since it is not necessary to completely remove the lid portion 14 from the support receiving body 13 by loosening the bolts 15, the height of the guide wheel 2 and the switching wheel 3 can be easily adjusted.

In addition, since a special part or a jig is not required for adjusting the height of the guide wheel 2 and the switching wheel 3, the management of the adjustment device 24 can be simplified.

As described above, the embodiments of the guide rail type vehicle according to the invention are described, however, the invention is not limited to the embodiments described above, and may be appropriately changed in the scope without departing from the gist of the invention.

For example, in the embodiments described above, the guide wheel 2 is connected to the top end 4a of the wheel axle 4 and then the switching wheel 3 is connected to the bottom end 4b, however, the switching wheel 3 may be connected to the top end 4a of the wheel axle 4 and then the guide wheel 2 may be connected to the bottom end 4b.

In addition, in the embodiments described above, the center of the guide wheel 2 and the switching wheel 3 are out of alignment, however, they may be aligned with each other.

In addition, in the first embodiment described above, the height adjustment shims 16 are formed in the annular shape, however, may be formed in a U-shape in a plan view. As described above, the height adjustment shims 16 can be easily moved only by loosening the bolts 15 because the height adjustment shims 16 is formed in a U-shape, even though the lid portion 14 is not completely removed from the support receiving body 13.

In addition, in the second embodiment described above, the support receiving body side teeth 22 and the lid portion side teeth 23 are formed in a substantially triangular shape in a side view, however, since the support receiving body side teeth 22 and the lid portion side teeth 23 may be formed so as to engage with each other, they may not be the same shape and may be formed in a shape other than the substantially triangular shape in a side view.

In addition, the third embodiment described above, the nut 33 is rotated and moved along the screw portion 32, however, for example, in a case where the guide wheel 2 and the switching wheel 3 are not eccentric to each other, the position of the nut 33 can be adjusted with respect to the screw portion 32 by rotating the wheel axle 4 (the screw portion 32).

The invention claimed is:

1. A guide rail vehicle for running along a guide rail, the guide rail vehicle comprising:
    a guide wheel which comes into rolling contact with the guide rail;
    a switching wheel which comes into rolling contact with a switching rail installed at a switching location of the guide rail;
    a wheel axle of which the guide wheel is fixed on one end thereof and the switching wheel is fixed on another end thereof;
    a support receiver of which a dimension in a height direction is smaller than a corresponding length dimension of the wheel axle and which supports the wheel axle; and
    an adjustment device which is capable of adjusting a size of a gap between the support receiver and the guide wheel and a gap between the support receiver and the switching wheel while both the guide wheel and the switching wheel remain fixed on the respective ends of the wheel axle without changing their positions along the length of the wheel axle,
    wherein the adjustment device includes a plurality of height adjustment shims, the wheel axle being inserted into the plurality of height adjustment shims,
    wherein the plurality of height adjustment shims are slidably provided between the guide wheel and the switching wheel, and
    wherein the plurality of height adjustment shims are mounted at one or both of the gap between the support receiver and the guide wheel and the gap between the support receiver and the switching wheel.

2. The guide rail vehicle according to claim 1,
    wherein the wheel axle is detachably mounted on the support receiver, and
    wherein the plurality of height adjustment shims have an annular shape.

3. The guide rail vehicle according to claim 1, wherein each of the height adjustment shims is a single piece extending completely around the wheel axle.

4. A guide rail vehicle for running along a guide rail, the guide rail vehicle comprising:
    a guide wheel which comes into rolling contact with the guide rail;
    a switching wheel which comes into rolling contact with a switching rail installed at a switching location of the guide rail;
    a wheel axle of which the guide wheel is connected to one end thereof and the switching wheel is connected to another end thereof;
    a support receiver of which a dimension in a height direction is smaller than a corresponding length dimension of the wheel axle and which supports the wheel axle; and
    an adjustment device which is capable of adjusting a size of a gap between the support receiver and the guide wheel and a gap between the support receiver and the switching wheel,
    wherein the support receiver comprises:
    a support receiving body having a concave portion to which the wheel axle is able to be inserted from a side of the support receiving body, and having a dimension in the height direction that is shorter than the corresponding length dimension of the wheel axle by a height adjustment allowance; and
    a lid portion, which is joined to the support receiving body with a bolt and covers the concave portion,
    wherein the adjustment device has teeth provided between contacting surfaces of the support receiving body and the lid portion with a predetermined gap in the height direction, the teeth provided on the support receiving body and the lid portion being engaged to each other, and
    wherein a long hole is formed to the lid portion, the long hole extending in the height direction in such a way that the bolt is able to be inserted through the long hole.

* * * * *